United States Patent [19]

Imoto

[11] Patent Number: 5,787,307
[45] Date of Patent: Jul. 28, 1998

[54] APPARATUS FOR DRAINING OFF ELECTRIC CHARGES FROM A BUS CONNECTOR PINS HAVING A SWITCH CONTROLLER FOR CONTROLLING TWO SWITCHES WHERE THE SECOND SWITCH CONNECTS THE PINS TO GROUND

[75] Inventor: Naoyuki Imoto, Zama, Japan

[73] Assignee: International Business Machines Corporation, Armonk, N.Y.

[21] Appl. No.: 542,369

[22] Filed: Oct. 12, 1995

[30] Foreign Application Priority Data

Nov. 18, 1994 [JP] Japan ................... 6-284633

[51] Int. Cl.⁶ .................................. G06F 13/00
[52] U.S. Cl. ................. 395/836; 395/309; 395/311; 395/834; 395/882
[58] Field of Search .................. 323/263; 324/537; 363/71; 364/745; 326/38, 66; 340/825.91; 341/122; 395/831, 309, 311, 834, 836, 882; 439/75

[56] References Cited

U.S. PATENT DOCUMENTS

| | | | |
|---|---|---|---|
| 4,486,753 | 12/1984 | Saeki et al. | 340/825.91 |
| 4,521,762 | 6/1985 | Kapral | 341/122 |
| 4,774,451 | 9/1988 | Mehnert et al. | 323/263 |
| 4,901,268 | 2/1990 | Judd | 364/745 |
| 4,936,785 | 6/1990 | Krug et al. | 439/75 |
| 4,975,644 | 12/1990 | Fox | 324/318 |
| 5,027,315 | 6/1991 | Agrawal et al. | 326/38 |
| 5,036,224 | 7/1991 | Wendell | 326/66 |
| 5,101,153 | 3/1992 | Morong, III | 324/537 |
| 5,428,523 | 6/1995 | McDonnal | 363/71 |
| 5,566,347 | 10/1996 | Patrick | 395/831 |

*Primary Examiner*—Thomas G. Lee
*Assistant Examiner*—Po C. Huang
*Attorney, Agent, or Firm*—Felsman, Bradley, Gunter & Dillon

[57] ABSTRACT

Disclosed is an information processing apparatus which includes a processor, one or more input/output devices and an input/output bus for connecting the processor to the input/output devices. A bus connector is included for expanding the input/output bus to an external device. A first switch is used for electrically disconnecting bus signals that are carried by the input/output bus to corresponding connector pins of the bus connector. A second switch is used for electrically grounding the connector pins in the bus connector. The apparatus further includes switch control means for controlling the first and the second switches. When no external device is connected to the bus connector and the connector pins are exposed externally, the first switch is opened to cut off bus signals and to prevent the transmission of high frequency signals to the connector pins. When the first switch is opened, the second switch is closed at the same time and the connector pins are pulled down to drain off the electric charges from the connector pins to the ground. When an external device is connected to the bus connector the first switched is closed and the second switch is opened.

20 Claims, 7 Drawing Sheets

APPARATUS FOR DRAINING OFF ELECTRIC CHARGES FROM A BUS CONNECTOR PINS HAVING A SWITCH CONTROLLER FOR CONTROLLING TWO SWITCHES WHERE THE SECOND SWITCH CONNECTS THE PINS TO GROUND

BACKGROUND OF THE INVENTION

1. Field of the Invention

The present invention relates to an information processing apparatus that can adequately suppress electromagnetic interference (EMI) noise, and a control method for the apparatus; and in particular, to an information processing apparatus that has, on its surface, a bus connector that is used to expand an input/output bus to an external expansion device, and a control method for the apparatus. More specifically, the present invention pertains to an information processing apparatus that can adequately reduce electromagnetic interference noise due to the antenna effect at a bus connecter, which is provided on the surface of the case of the apparatus, and to a control method for the apparatus.

2. Description of Related Art

As a result of current technical improvements, portable personal computers (or notebook computers) that are compactly and lightly made, and that can easily be carried are in widespread use.

Generally, included in a computer is an input/output bus across which a CPU, which controls the operation of the whole computer system, can exchange information concerning addresses or data with various input/output devices. The main specifications for a bus architecture are, for example, the Industry Standard Architecture (ISA) bus and the Peripheral Component Interconnect (PCI) bus. System designers and users may connect input/output devices that have interface circuits that conform to the architecture of the input/output bus so that the hardware resources of the computer system can satisfy their needs.

Because of the compact size of notebook computers, only a limited number of interface circuits or input/output devices (external storage devices, printers, communication devices, etc.) can be connected to their internal input/output buses. As the surface area of the notebook type computer is small, the number of connection ports and connectors that can be provided is also limited. To allow for the expansion of the hardware resources that are available with notebook computers, and to provide a peripheral environment that is equivalent to that of a desktop computer, devices, such as "expansion/box units" or "docking stations," have been developed and are being used. A docking station has a bus connector, with which the device can be connected to a notebook computer, and an input/output expansion bus that permits the attachment of various input/output expansion devices that cannot be directly installed in a notebook computer. An expandable input/output device is, for example, an expansion HDD (e.g., an IDE HDD), an Small Computer System Interface (SCSI) device, or a Personal Computer Memory Card Interface Association (PCMCIA) card. The arrangement and the functions of the docking station are disclosed in detail in, for example, U.S. Pat. No. 5,450,271, issued Sep. 12, 1995 and application Ser. No. 08/416,398, filed Apr. 6, 1995, still pending both of which are owned in common with the present invention, and may be referred to for a detailed explanation of the docking station. U.S. Pat. No. 5,450,271 and application Ser. No. 08/416,398 pending are hereby incorporated by reference into the present application.

Figure 1:
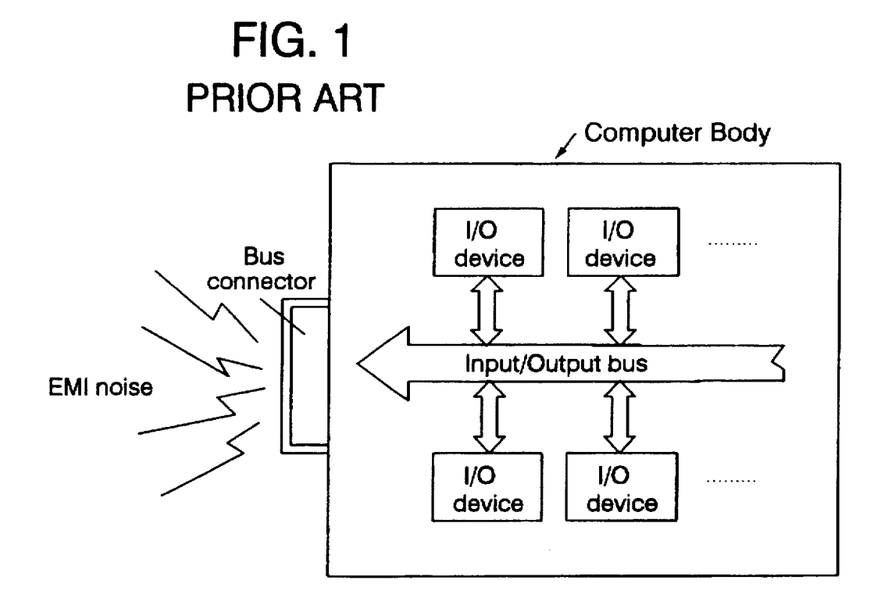
FIG. 1 is a block diagram showing a bus connector for the expansion of the input/output bus, that is provided on the surface of the case of conventional notebook computer (e.g., the rear of the computer) and that functions as a noise source.

When a device, such as the docking station, is connected to the bus connector at the rear surface of the computer, i.e., when the computer is docked, the state of all the pins of the connector is almost the same as when they are fully shielded internally, and under these conditions it is felt that electromagnetic interference noise will either not occur frequently or will not be absorbed at the bus connector. When the device is disengaged from the bus connector and the undocked computer is used as a stand-alone system, however, the pins of the bus connector are externally exposed (see FIG. 1). Since signals of relatively high frequency are carried across the bus during the operation of the system, when the connector pins that are electrically connected to the bus signals are externally exposed, they cause an antenna effect that involves the generation or the reception of radiation noise. This is not preferable from the view that countermeasures are required to suppress Electromagnetic Interference (EMI) noise. More specifically, the strength of an electric field that is radiated from the bus connector may violate the standards that are established by individual nations (e.g., VCCI (Standards For Suppression Of Electromagnetic Interference Noise Of Information Processing Apparatuses) in Japan, FCC standards in the United States, and CISPR standards in Europe) for the prevention of EMI noise that results from the use of information processing apparatuses in residential areas. The problem of the antenna effect at the bus connector, specifically as regards ISA and PCI, which are the main interface standards for an input/output bus, will now be briefly discussed.

The ISA bus is one of the buses that are the most widely used with personal computers for input and output. At present, there are many software applications and input/output devices that employ this bus.

Figure 2:
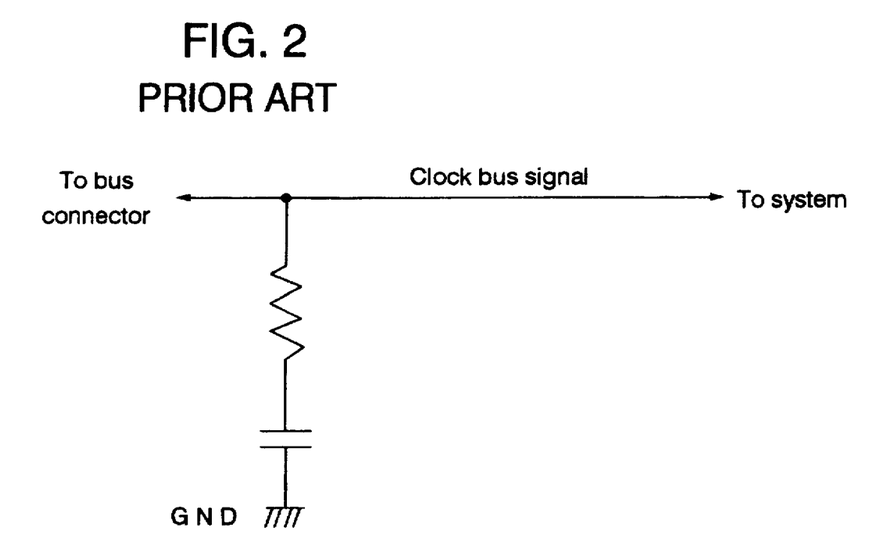
FIG. 2 is a schematic diagram showing an example of a conventional termination circuit that is provided for attenuating noise.

The bit width for the ISA bus is 8 or 16 bits and the operation frequency is rather low, about 8 MHz. Therefore, even when the bus connector is externally exposed, the strength of the electric field that employs the bus connector as a generation source is assumed to be too low to violate the various national radiation standards. The EMI noise problem can also be resolved by providing, at the end of the signal line of the bus, a circuit (hereafter referred to simply as an "termination circuit") that attenuates radiation noise, as is shown in FIG. 2. The termination circuit is generally designed to be grounded via a resistor and a capacitor, and parameters for it, such as the resistance of the resistor and the capacitance of the capacitor, are acquired through experimentation. It is not necessary, however, to provide the termination circuits for all of the signal lines that are included in the bus respectively. The provision of the termination circuits are required only on those signal lines along which are carried high frequency signals, such as clock signals, lower bit address signals, and control signals.

Since the ISA bus operates at relatively low frequencies, as is described above, it is difficult for it to transfer data at a speed that can match that of a recent high-speed processor or an input/output device. For example, the ISA bus sometimes can not meet the needs of high resolution video devices that employ many colors or the needs of application programs, and sometimes it can not perform the throughput that is required by some high speed hard disks, network controllers, full motion video adaptors, etc.

The bit width of the PCI bus is either 32 or 64 bits and its operation frequency is relatively high, i.e., 33 MHz or 66 MHz. The PCI bus can be employed with input/output devices and applications for them that require greater throughput than that which the ISA bus can provide.

On the other hand, the EMI noise problem with the PCI bus is more serious because the bus operates at high speed.

It is assumed that it is difficult for a structure where the connector pins for the PCI bus are externally exposed to satisfy the individually established national standards for the suppression of EMI noise. The provision of the above described termination circuits on signal lines that generates a high frequency could be considered one way to resolve the problem. However, since the parameter values for the resistors and the capacitors that constitute the respective termination circuit must be changed responsive to the operational frequency, 33 MHz or 66 MHz, the system designer and the manufacturer must increase their efforts for the suppression of EMI noise.

There is, therefore, a demand for an apparatus and a method that ensure a decrease in the antenna effect at a bus connector that is exposed on the surface of a computer case, such as on the rear face of a notebook computer. Especially when the input/output bus that is employed is a bus, such as a PCI bus, which easily generates a high frequency noise, the demand is urgent. Moreover, an apparatus and a method for suppressing EMI noise easily are demanded even for buses whose specifications, such as operational frequency, may be altered.

OBJECTS OF THE INVENTION

It is one object of the present invention to provide an information processing apparatus that can preferably remove electromagnetic interference noise and to provide a method for controlling the apparatus.

It is another object of the present invention to provide an information processing apparatus that can preferably reduce electromagnetic interference, which is due to the antenna effect of a bus connector, even when the bus connector, which is for the external expansion of an internal input/output bus, is provided on the surface of the apparatus that is used as a stand-alone unit.

SUMMARY OF THE INVENTION

To achieve the above objects, according to a first aspect of the present invention, an information processing apparatus includes a processor, one or more input/output devices and an input/output bus for connecting the processor to the input/output devices. A bus connector is included for expanding the input/output bus to an external device. A first switch is used for electrically disconnecting bus signals that are carried by the input/output bus to corresponding connector pins of the bus connector. A second switch is used for electrically grounding the connector pins in the bus connector. The apparatus further includes switch control means for controlling the first and the second switches.

According to a second aspect of the present invention, an information processing apparatus comprises a processor, one or more input/output devices and an input/output bus for connecting the processor to the input/output devices. A bus connector is included for expanding the input/output bus to an external device. A first switch is used for electrically disconnecting at least a part of bus signals that are carried by the input/output bus to corresponding connector pins of the bus connector. A second switch is used for electrically grounding the connector pins that are disconnected from the lines for the bus signals by the first switch. The apparatus further includes switch control means for controlling the first and the second switches.

According to a third aspect of the present invention, an information processing apparatus according to the first and the second aspect of the present invention further comprises detection means for ascertaining whether or not an external device is connected to the bus connector, and the switch control means controls the first and the second switches responsive to the detected result. In this case, when it is determined that an external device is connected to the bus connector, the switch control means closes the first switch and at the same time opens the second switch. When it is determined that no external device is connected to the bus connector, the switch control means opens the first switch and at the same time closes the second switch.

According to a fourth aspect of the present invention, a method for controlling an information processing apparatus, which includes a processor, one or more input/output devices, an input/output bus for connecting the processor to the input/output devices, a bus connector for expanding the input/output bus to an external device, a first switch for electrically disconnecting individual bus signal lines in the input/output bus from corresponding connector pins of the bus connector, a second switch for electrically grounding the connector pins in the bus connector, switch control means for controlling the first and the second switches, and detection means for ascertaining whether or not an external device is connected to the bus connector. The method includes a first connection step, at which the switch control means closes the first switch and opens the second switch upon the detection, by the detection means, of an external device that is connected to the bus connector. A second connection step is performed, at which the switch control means opens the first switch and closes the second switch upon the determination, by the detection means, that no external device is connected to the bus connector. The first and the second connection steps are interchangeable.

According to a fifth aspect of the present invention, a method for controlling an information processing apparatus, which includes a processor, one or more input/output devices, an input/output bus for connecting the processor to the input/output devices, a bus connector for expanding the input/output bus to an external device, a first switch for electrically disconnecting at least a part of those bus signal lines in the input/output bus from corresponding connector pins of the bus connector, a second switch for electrically grounding the connector pins that are disconnected from the bus signal by the first switch, switch control means for controlling the first and the second switches, and detection means for ascertaining whether or not an external device is connected to the bus connector. The method includes a first connection step, at which the switch control means closes the first switch and opens the second switch upon the detection, by the detection means, of an external device that is connected to the bus connector. Next, a second connection step is performed, at which the switch control means opens the first switch and closes the second switch upon the determination, by the detection means, that no external device is connected to the bus connector. The first and the second connection steps are interchangeable.

According to the present invention, the internal input/output bus of the information processing apparatus is connected to the bus connector by the first switch, and the pins of the bus connector are grounded by the second switch. When no external device is connected to the bus connector and the connector pins are exposed externally, the first switch is opened to cut off bus signals and to prevent the transmission of high frequency signals to the connector pins. When the bus connector, which acts as a conductive body, is exposed, even though the bus signals are cut off, the antenna effect easily occurs. Further, there are also many cases where the connector pins are electrified by the system operation that is performed immediately before the first switch is opened. Therefore, when the first switch is opened, the second switch is to be closed at the same time so that the connector pins are grounded to drain off the electric charges from the connector pins to the ground. In this manner, even when the bus connector on the surface of the PC body is externally exposed, bus signals that may become sources for the generation of electromagnetic interference noise can be retained within a fully shielded electrostatic structure, and the removal of the antenna effect is ensured. The method that involves the draining off of charges to the ground is easier to implement and less expensive than the one that involves the provision of termination circuits, and furnishes the same effects at any operation frequency. When an external device (e.g., a docking station or another computer) is connected to the bus connecter, the switching operation must be inverted. In other words, the first switch should be closed while the second switch should be opened.

When the detection means, for ascertaining whether an external device is connected to the bus connector, is provided in an information processing apparatus according to the first and the second aspect, the automatic operation of the first and the second switches can be performed by the system (the third aspect). More specifically, in response to the detection of the connection of an external device, the switch control means closes the first switch and opens the second switch; while in response to the detection of the disconnection (or the separation from) of the external device, the switch control means opens the first switch and closes the second switch.

The present invention is especially intended for use with an information processing apparatus that employs, as a input/output bus, a bus, such as a PCI bus, that has a large bit width, is operated at high speed, and has a changeable operation frequency.

As described in the second and the fifth aspect of the present invention, the first and the second switches are not required for all the bus signals that are carried on the input/output bus, or for all the pins of the bus connector. Even when the first and the second switches are provided only on some bus signals that tend to generate a high frequency, such as clock signals, lower bit address signals, and control signals, an adequate effect can be obtained.

Other objects and advantages of the present invention will become apparent during the following detailed explanation of the embodiments of the present invention that is presented while referring to the accompanying drawings.

DETAILED DESCRIPTION OF THE INVENTION

Figure 3:
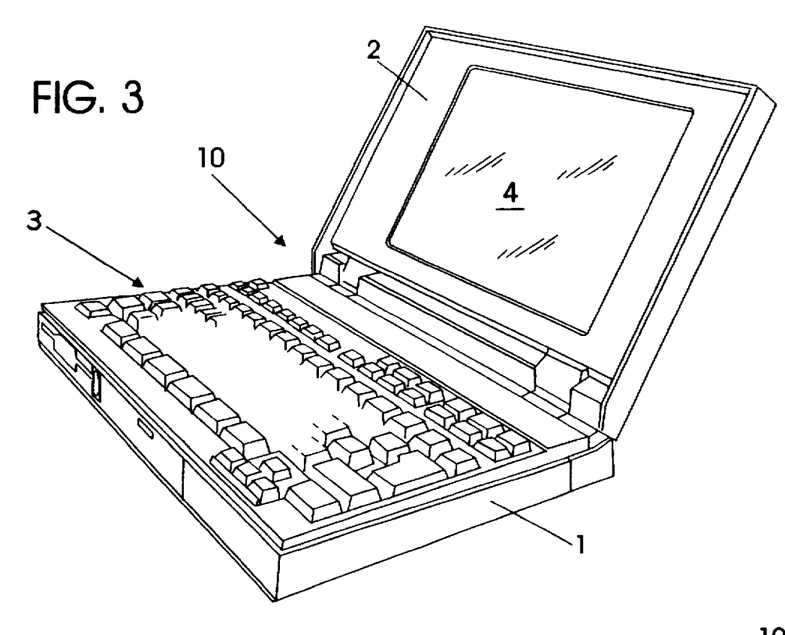
FIG. 3 is a front perspective view of a notebook computer 10 when its cover, in which is mounted a liquid crystal display panel (LCD), is open according to one embodiment of the present invention.
Figure 4:
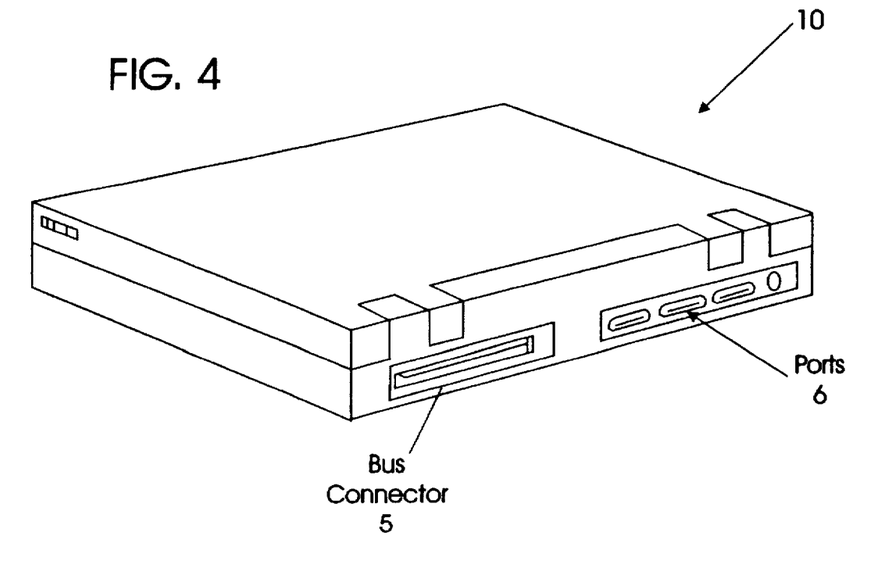
FIG. 4 is a rear perspective view of the notebook computer 10 shown in FIG. 3 when the cover is closed.

FIGS. 3 and 4 are illustrations showing the external appearance of the casing of a notebook computer 10 that is employed in one embodiment of the present invention. In FIG. 3, a front perspective view, the notebook computer 10 is ready for use with its cover opened. The computer 10 includes a thin body 1 and a cover 2 that is hinged on the rear edge of the body 1 so that it can be freely opened and closed. A keyboard 3, which serves as an input means for the computer 10, is provided on the top surface of the body 1. A liquid crystal display (LCD) panel 4, which serves as a display means for the computer 10, is located inside the cover 2. FIG. 4 is a rear perspective view of the computer 10 with the cover closed. As is shown in FIG. 4, on the rear of the computer 10 is a bus connector 5, to which an external device such as a docking station or another computer can be connected, and ports 6, to which input/output devices such as a modem and a printer can be connected. The bus connector 5 is employed for the expansion of an input/output bus (which will described later) that is one component of the internal circuit of the computer 10, and the connector pins of the bus connector 5 are assigned for the connection of individual bus signals on the input/output bus. The discharge port for the bus connector 5 is sometimes covered with a shielding plate when the connector 5 is not in use. It should be noted that, in view of an electrostatic shield, the bus connector 5 is externally exposed.

Figure 5:
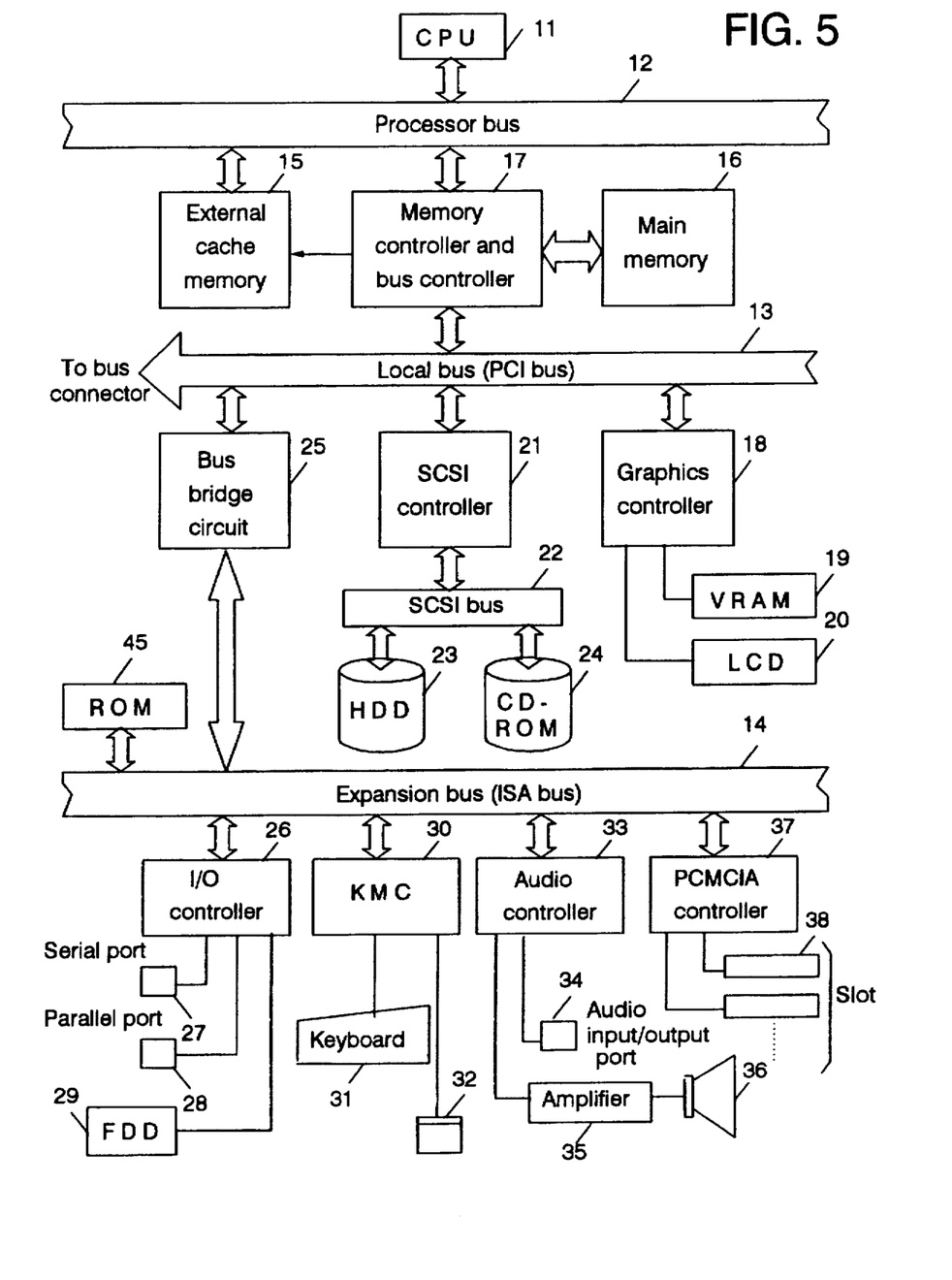
FIG. 5 is a schematic block diagram of the internal hardware arrangement of the notebook computer shown in FIGS. 3 and 4.

FIG. 5 is a schematic block diagram is used to illustrate the hardware arrangement of the notebook computer 10 according to the embodiment of the present invention. The system 10 supports a three-layer bus architecture that includes a processor bus 12, a local bus 13, and an expansion bus 14 to enable a CPU 11 to communicate with individual input/output devices. The processor bus 12, a high-speed bus that employs an external signal from the CPU 11, is employed mainly for communication with an external cache memory 15, a main memory 16.

The external cache memory 15 is a memory in which data and commands that are frequently used are temporarily stored. Generally, a high-speed memory, such as SRAM, is employed as the external cache memory 15. The main memory 16 is employed for loading therein basic software, such as an operating system (OS), and application programs, and for being used as a work area for the CPU 11. DRAM is ordinarily used for the main memory 16.

The processor bus 12 communicates with the local bus 13 via a bus controller 17. The bus controller 17, a circuit that enables to exchange signals as an intermediary between different architectures, functions as a buffer by absorbing the difference in the transfer speeds of the processor bus 12 and the local bus 13. The bus controller 17 in this embodiment is constituted by one chip that includes a 25 memory controller.

A Peripheral Component Interconnect (PCI) bus with a relatively high data transfer speed is employed as the local bus 13. Input/output devices, such as a graphics controller 18 and SCSI controller 21, for which high throughput is required, are connected to the local bus 13.

The graphics controller 18 is a peripheral LSI for performing the graphic processing of a graphic command that is received from the CPU 11; a VGA device is an example of such a controller. The VRAM 19 is a screen buffer for temporarily storing graphic information that is being processed. A liquid crystal display device (LCD) 20 actually displays the contents of the VRAM 19.

The Small Computer System Interface (SCSI) controller 21 is an LSI for SCSI control, and serves as an initiator of commands that are carried on the SCSI bus 22. Input/output devices (e.g., various storage devices such as an HDD 23 and a CD-ROM 24) that have an SCSI interface are connected to the SCSI bus 22.

One end of the local bus 13 is connected to the above described bus connector 5 for external expansion. The hardware arrangement for the suppression of EMI noise that is in the vicinity of the bus connector 5 is associated with the subject matter of the present invention, and will be described below.

The expansion bus 14, that is located at the lowest layer level, communicates with the local bus 13 via a bus bridge circuit 25. The expansion bus 14 is employed to connect input/output devices for which very high throughput is not required, and an Industrial Standard Architecture (ISA) bus, for example, is used. Connected to the expansion bus 14 are an I/O controller 26, a keyboard/mouse controller (KMC) 30, an audio controller 33, a Personal Computer Memory Card Interface Association (PCMCIA) controller 37, and a ROM 45. The bus bridge circuit 25 in this embodiment is designed so that an interrupt controller, a DMA controller, and a system timer are provided on a single chip. The interrupt controller always monitors a specific signal line on the local bus 13. When an interrupt originates at any of the input/output devices on the local bus 13, the interrupt controller detects it (this will be described later) and informs the CPU 11 (more specifically, a BIOS that the CPU 11 executes).

The I/O controller 26 is a peripheral LSI for controlling the timing for data transfers between the expansion bus 14 and various input/output devices (e.g., a modem and a printer), which are connected via a serial port 27 and a parallel port 28, or an auxiliary storage device such as a floppy disk drive (FDD) 29.

The KMC 30 is a peripheral LSI for processing a input matrix a keyboard 31 and coordinate input by a mouse 32.

The audio controller 33 is a peripheral LSI for handling the input and output of audio signals. In this embodiment, the audio controller 33 exchanges an audio signal via an audio input/output port 34 and outputs sound at a loudspeaker 36 via an amplifier 35.

The PCMCIA controller 37 is an interface circuit for enabling the exchange of data between the PCMCIA card and the ISA bus 14. One or more slots 38, into which a PCMCIA card can be inserted, are provided on the local side of the PCMCIA controller 37.

The ROM 45 is a nonvolatile read only memory to which data are written as is determined during the manufacturing process. The ROM 45 is employed for the permanent storage of procedures that are employed when the system 10 is powered on (e.g., power-on self test (POST)) and the codes for the program (basic input/output system (BIOS)) for the operation of the internal hardware of the system 10.

Actually, the notebook computer 10 comprises many interface circuits and input/output devices other than those shown in FIG. 5. It would be understood by one having ordinary skill in the art that for convenience sake unnecessary hardware components are omitted in this specification.

Figure 6:
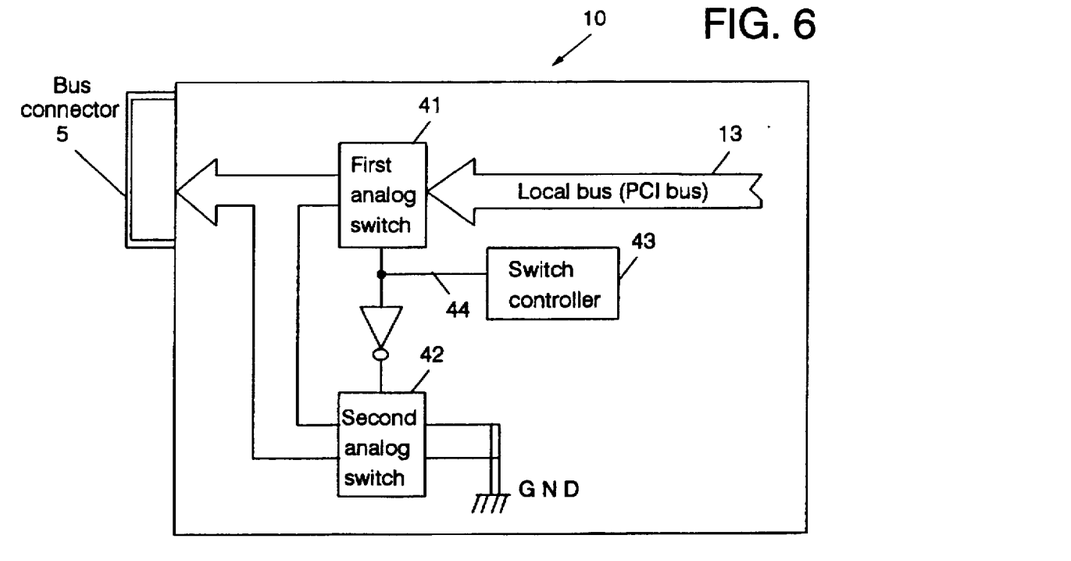
FIG. 6 is a block diagram illustrating a selected hardware portion of the notebook computer 10 that is especially associated with the EMI noise suppression countermeasures for the bus connector.

FIG. 6 is a diagram illustrating a hardware segment, which is extracted from the hardware arrangement of the notebook computer 10, that is especially associated with the EMI noise suppression countermeasures for the bus connector 5.

One end of the local bus 13 extends to the bus connector 5, which is located on the surface of the case of the computer 10 (the rear face of the case in FIG. 4). Although not illustrated, the respective pins of the bus connector 5 are assigned to the corresponding bus signals on the local bus 13.

A first analog switch 41 is provided, in the vicinity of the bus connector 5, on the local bus 13 so that it can connect the bus signal lines on the local bus 13 to, and disconnect them from corresponding connector pins. A second analog switch 42, which is located between the first analog switch 41 and the bus connector 5, is employed to connect the bus signal lines on the pin side of the bus connector 5 to the ground or to disconnect them from the ground. The detailed mechanism for the connection and the disconnection of the bus signal lines will be described later.

The opening and closing of the first and the second analog switches 41, 42 are controlled by the switching controller 43. The switching controller 43 determines whether or not an external device (e.g., a docking station or another computer) is connected to the bus connector 5 (or receives, from another hardware component, a detection result concerning the connection/disconnection of an external device), and sends a switching control signal 44 to the first analog switch 41 and an inverted switching control signal 44 to the second analog switch 42. When an external device is connected to (docked at) the bus connector 5, the switching controller 43 forwards a switching control signal 44 that instructs the first analog switch to close. When there is no external device connected to (undocked at) the bus connector 5, the switching controller 43 forwards a switching control signal that instructs the first analog switch 41 to open. Since an inverted switching control signal 44 is forwarded to the second analog switch 42, when the first analog switch 41 is closed, the second analog switch 42 is opened. And when the first analog switch 41 is opened, the second analog switch 42 is closed. The mechanism that ascertains whether or not an external device is connected to the bus connector 4 will be described later.

Figure 7:
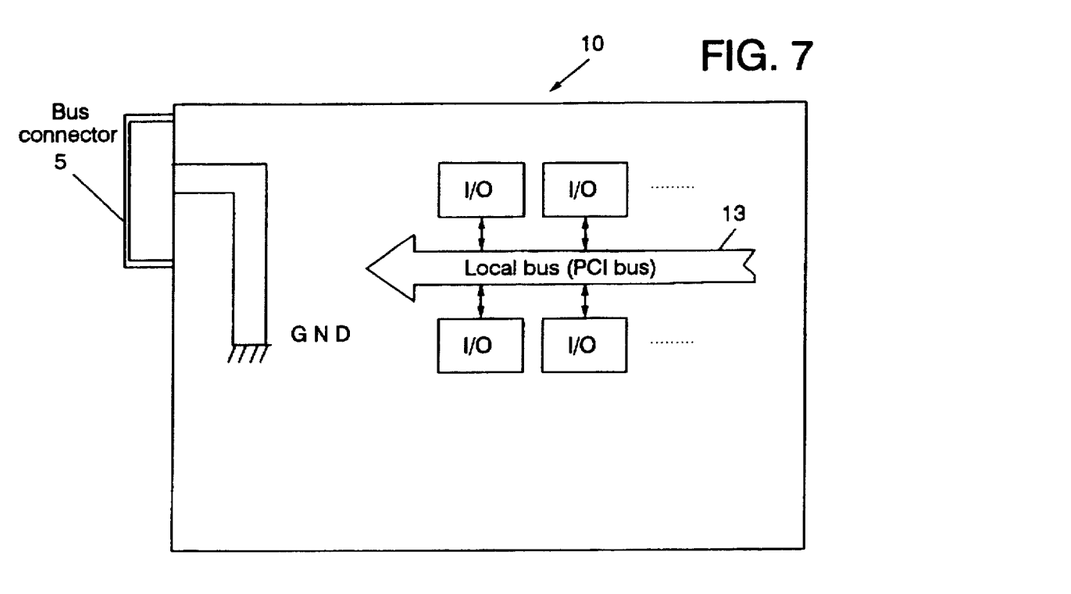
FIG. 7 is a block diagram showing the equivalent circuitry shown in FIG. 6 when the notebook computer 10 is in an undocked state.

FIG. 7 is a block diagram of the equivalent circuitry of the computer 10 in the undocked state. The end of the local bus 13 is closed off by the first analog switch 41 and thus is terminated within the case of the computer 10. In other words, the local bus 13 is completely shielded electrostatically, and no electromagnetic interference noise that occurs at the end of the local bus 13 will have any external effect. Also, the pins of the bus connector 5 are grounded via the second analog switch 42, and therefore, since the electric charges on the connector pins and any received electromagnetic interference noise are drained off to the ground, the antenna effect is drastically reduced.

The first and second analog switches are not required for all the bus signal lines on the local bus 13. When the first and second analog switches 41 and 42 are provided for only the bus signal lines that carry high frequency signals (e.g., clock system signals, such as clock signals, lower bit address signals, and control signals), the EMI noise suppression countermeasures are satisfactory and manufacturing costs are reduced.

Figure 8:
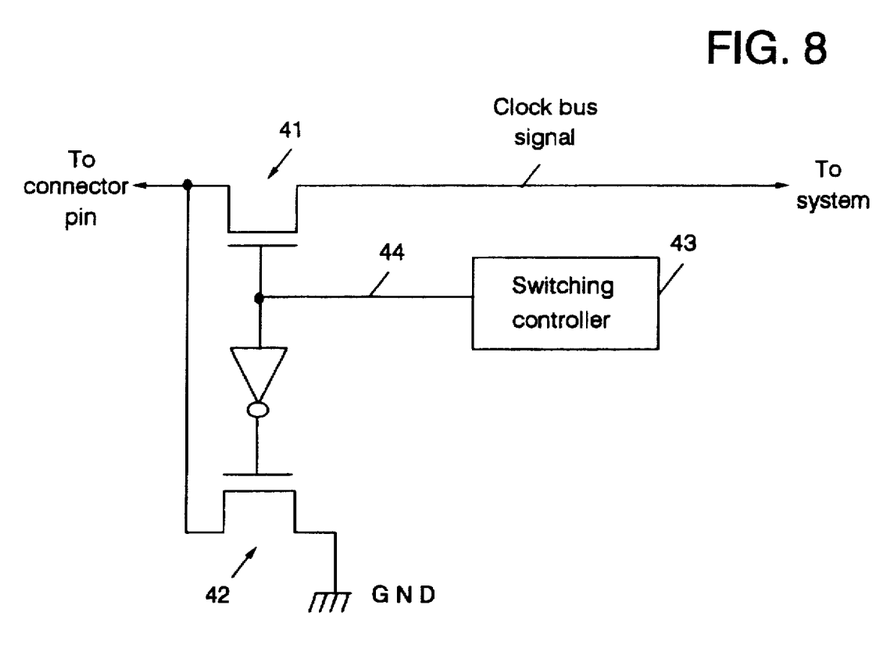
FIG. 8 is a diagram that specifically shows the first and second analog switches 41 and 42 which are used for relaying/disconnecting a single bus signal.

FIG. 8 is a diagram that specifically shows the first and second analog switches 41 and 42 that are provided for one of the bus signals. The analog switches 41 and 42 can be, for example, MOSFETs. When a switching control signal 44 that is outputted by the switching controller 43 is directly transmitted to the gate of the first analog switch 41, it is transmitted via an inversion element to the gate of the second analog switch 42. Since an identical signal 44 is employed for opening and closing the switches 41 and 42 and the signal 44 that is sent to the second analog switch 42 is always inverted, an erroneous operation whereby the switches 41 and 42 are both opened or both closed at the same time will not occur.

Either an N-channel or a P-channel MOSFET may be used for the analog switches 41 and 42. With an N-channel MOSFET, in the docked state the switching controller 43 sets the switching control signal 44 high and renders the FET 41 on and the FET 42 off. In the undocked state, the switching controller 43 sets the switching control signal 44 low, and renders the FET 41 off and the FET 42 on (the signal settings are inverted when the P-channel MOSFET is employed).

The switching controller 43 ascertains whether or not an external device is connected to the bus connector 5, or receives a detection result from another hardware component, and opens and closes the first and the second analog switches 41 and 42. Although this has been described above, the mechanism by which is ascertained whether or not an external device is connected to the bus connector 5 will be specifically explained.

Figure 9:
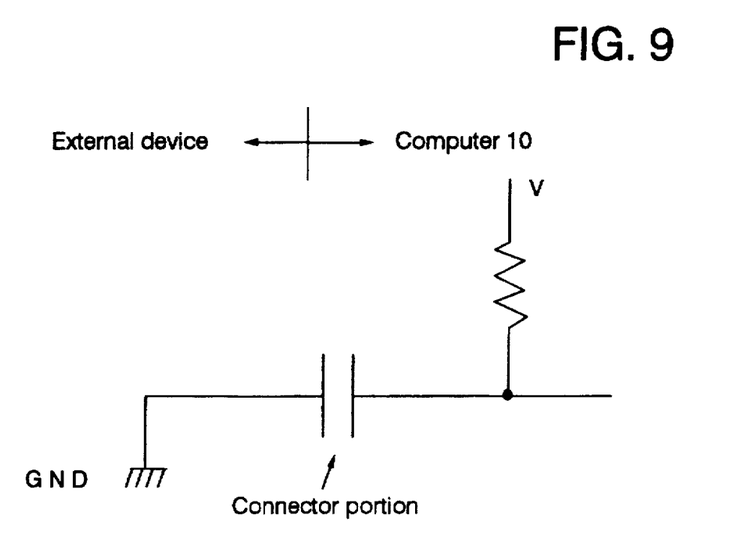
FIG. 9 is a schematic diagram of an example mechanism for ascertaining whether or not an external device is connected to the bus connector 5.

The first mechanism example is for a method that provides a dedicated signal (#DOCKED) for the detection of the connection and that detects a connection using hardware by referring to the level of the signal. As is shown in FIG. 9, the level of the signal #DOCKED is pulled down on the external device side, while the level of the signal #DOCKED is pulled up via a protective resistor in the computer 10. In this way, with the signal #DOCKED active-low, the computer 10 can detect the connection of an external device. This method can be implemented by a relatively simple circuit structure, and it is also easy to provide the mechanism for the switching controller 43. Further, even during the operation of the computer 10, the connection/disconnection of an external device can be detected. In another method that is similar to this one, a mechanical switch for detecting a connection is converted into an electric signal that is inputted to the switching controller 43.

The second mechanism example is of a method that employs a "configuration cycle" that conforms to the PCI specifications. The configuration cycle is a confirmation operation that, to establish the hardware configuration information, determines whether or not an input/output device is present on the PCI bus when the system is initialized. That is, one of the address signals (AD11 through AD31) on the PCI bus is assigned to each of the input/output devices that may be connected to the PCI bus and is used as a chip select. The bus controller 17 receives a command from the CPU 11 that executes an initialization program for the system 10 and renders the address signals active, one after another. When the address that is assigned to an input/output device becomes active, that device renders #DEVSEL active to acknowledge the signal reception, so that the initialization program can confirm the presence of the input/output device respectively. Since an external device that is to be connected via the bus connector 5 is also, in a broad sense, one of the input/output devices, so one of the address signals is assigned to it. When the configuration cycle is executed, it can be determined whether or not that device is connected. The initialization program need only inform the switching controller 43 of the detection result that is obtained during the configuration cycle. If the local bus 13 conforms to the PCI bus architecture, it is possible to detect the connection of an external device by using the configuration cycle. It should be noted that this method can be applied only at the time of the initial setting of the system 10.

The third mechanism example is of a method that employs an interrupt request from an external device. As is well known, some of the input/output devices that communicate with the CPU via the bus can issue interrupt requests to the CPU. It would be easily understood by one having ordinary skill in the art that an external device that is connected to the bus connector 5 is also, in the broad sense, one of the input/output devices, and can issue an interrupt request to the CPU that the device communicates with (this is disclosed in, for example, the previously mentioned application Ser. No. 08/416,398 where it states that a docking station generates an interrupt signal that requests the connection and disconnection of a host notebook computer). More specifically, an interrupt controller (which is included in the above described bus bridge circuit 25 in this embodiment) detects the generation of an interrupt and reports this to the CPU 11 (more specifically, the BIOS that the CPU 11 executes), and an interrupt factor is examined using the BIOS. Therefore, when the interrupt is determined to be the request for the connection of an external device to the bus connector, the detection result must be reported using the BIOS to the switching controller 43. It should be noted that this method can be applied only during the ordinary operation status during which an interrupt request can be handled, and cannot be applied at the time of powering on the system.

The subject matter of the present invention is not itself the method by which is detected the connection of an external device to the bus connector 5. Thus, detection means according to the present invention for detecting the connection of an external device should not be understood as being limited to the above described examples. The present invention can be implemented by using other detection means and methods.

Figure 10:
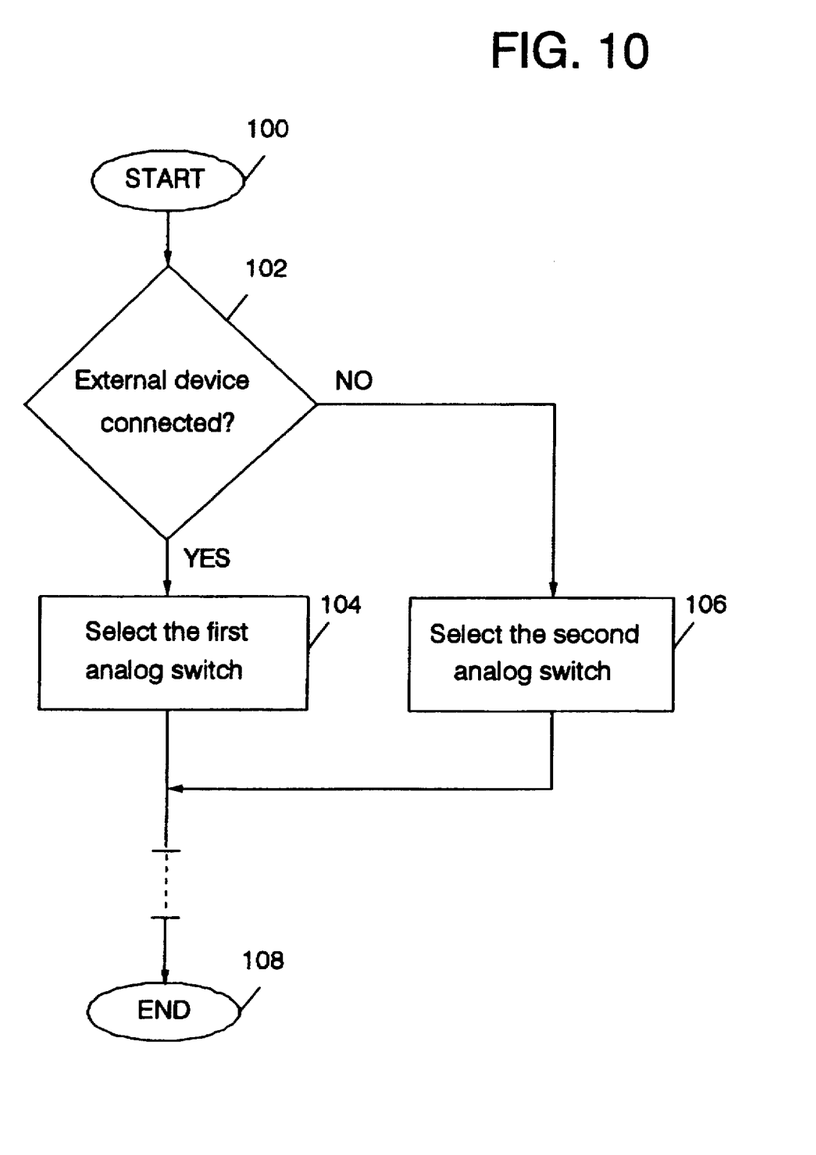
FIG. 10 is a flowchart of the operation of the EMI noise suppression system for explaining the operation of switching controller 43 when the system 10 is powered on in accordance with the present invention.

FIG. 10 is a flowchart for an example operation of an EMI noise suppression system, and more specifically, details the processing of the switching controller 43 when powering on the system 10. First, at step 100, with the system powered on, the power-on self test (POST) program is executed, and the checking of the memory 16 and the initialization of the hardware components are performed. The configuration cycle (previously described) that is performed on the PCI bus should be understood as being part of the hardware initialization routine.

At decision block 102, a check is performed to determine whether or not an external device (a docking station or another computer) is connected to the bus connector 5. The determination can be performed by, for example, the first or the second connection detection mechanism described above.

When the decision is affirmative, program control advances to step 104, where the switching controller 43 outputs the switching control signal 44 to close the first analog switch 41 and to open the second analog switch 42. The closed/open status of the switches 41 and 42 are maintained until the system 10 is powered off or until the next reset process is performed.

When the decision is negative, program control moves to step 106, where the switching controller 43 outputs the switching control signal 44 to open the first analog switch 41 and close the second analog switch 42. At this time, the system 10 falls into the state shown in FIG. 7, and the pins of the unused bus connector 5 are grounded. The open/closed states of the switches 41 and 42 are maintained until the system 10 is powered off or until the next reset process is performed.

Figure 11:
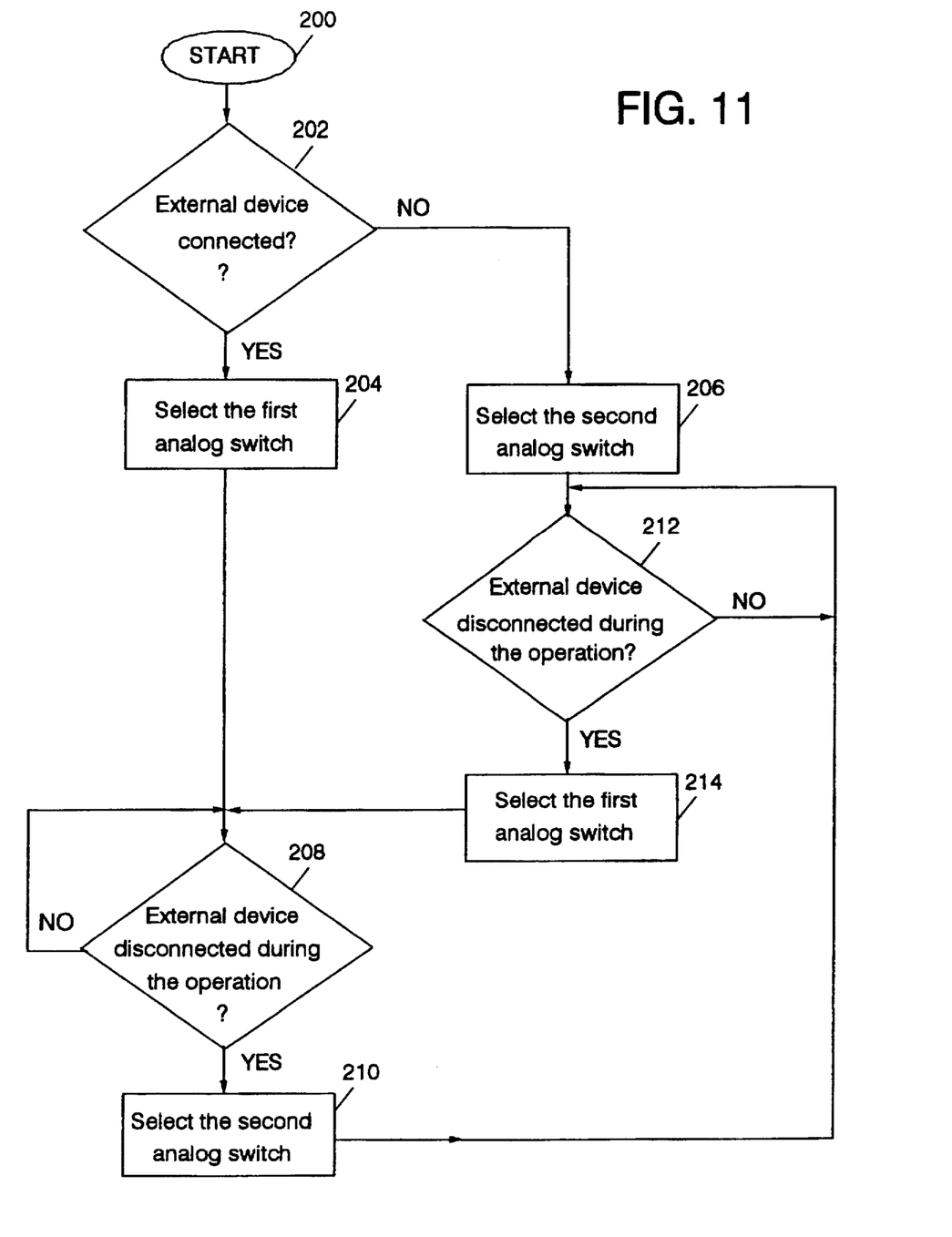
FIG. 11 is a flowchart for an expanded operation of the EMI noise suppression system, and more specifically, for the processing wherein is included a step at which an external device is disconnected from or is newly connected with the system 10 in the power-on state (the operating state) after the switching controller 43 has already set the statuses of the switches 41 and 42.

FIG. 11 is a flowchart for an expanded operation of the EMI noise suppression system, and more specifically, for the processing wherein is included a step at which an external device is disconnected from or is newly connected with the system 10 in the power-on state (the operating state) after the switching controller 43 has already set the statuses of the switches 41 and 42.

Since the procedures at steps 200 through 206 are the same as those at steps 100 through 106 in FIG. 10, an explanation of them will not given here.

When, at step 204, the closing of the first analog switch 41 has been selected, at decision block 208 a check is performed to determine whether or not the external device was disconnected during the operation. Program control waits at block 208 until the disconnection has been detected. This decision can be accomplished by the first or the third connection detection mechanism describe above.

When, at block 208, the disconnection of the external device is detected, program control goes to step 210, where the switching controller 43 selects the second analog switch to be closed. Program control then moves to succeeding decision block 212, and waits until the connected state of the bus connector 5 is changed (this will be described below).

When, at step 206, the closing of the second analog switch 42 has been selected, at decision block 212 a check is performed to determine whether the connection of the external device was performed during the operation. Program control waits at decision block 212 until the connection is detected. This decision can be accomplished by the first or the third connection detection mechanism described above.

When, at decision block 212 the connection of the external device is detected, program control advances to step 214, where the switching controller 43 selects the closing of the first analog switch 41. Program control then moves to decision block 208, and waits until the connected state of the bus connector 5 is changed (described above).

At steps 208 and 212 it is premised that the system 10 and the external device support a hot plug in (plug & play) function. Since the technique for the hot plug in is not the subject of the present invention, a detailed explanation of it will not be given in this specification. It would, however, be easily understood by one having ordinary skill in the art that conventional techniques (e.g., as described in application Ser. No. 08/416,398) for hot plug in technique for bus signals can be applied at both steps.

As described above in detail, according to an information processing apparatus and a method for controlling the apparatus, even when the apparatus has a bus connector, which is for the expansion of an internal input/output bus to an external device, on the surface of its casing, electromagnetic interference noise due to the antenna effect at the bus connector can be satisfactorily reduced when the apparatus is used as a stand-alone unit.

While the invention has been particularly shown and described with respect to preferred embodiments thereof, it should be understood by those skilled in the art that the foregoing and other changes in form and detail may be made therein without departing from the spirit and scope of the invention as defined in the appended claims. For example, although a notebook computer is employed as a specific example of an information processing apparatus, the present invention can naturally be applied to other types of information processing apparatus that has a connector for bus expansion. Further, the present invention can be applied for the connection of not only a docking station, but for the connection of another external device (a desktop or notebook device) to the bus connector that is provided on the rear face of the notebook computer.

What is claimed is:

1. An information processing apparatus comprising:

a processor;

at least one input/output device;

an input/output bus for connecting said processor to said at least one input/output device;

a bus connector for expanding said input/output bus to an external device;

a first switch for electrically disconnecting bus signals that are carried by said input/output bus to corresponding connector pins of said bus connector;

a second switch for electrically grounding said connector pins in said bus connector; and switch control means for controlling said first and said second switches.

2. The information processing apparatus according to claim 1, further comprising detection means for ascertaining whether or not an external device is connected to said bus connector, wherein said switch control means controls said first and said second switches responsive to the detected result.

3. The information processing apparatus according to claim 2, wherein when it is determined that an external device is connected to said bus connector, said switch control means closes said first switch and at the same time opens said second switch, and when it is determined that no external device is connected to said bus connector, said switch control means opens said first switch and at the same time closes said second switch.

4. The information processing apparatus according to claim 1, wherein said input/output bus is a Peripheral Component Interconnect (PCI) bus.

5. An information processing apparatus comprising:

a processor;

at least one input/output device;

an input/output bus for connecting said processor to said at least one input/output device;

a bus connector for expanding said input/output bus to an external device;

a first switch for electrically disconnecting at least a part of bus signals that are carried by said input/output bus to corresponding connector pins of said bus connector;

a second switch for electrically grounding said connector pins that are disconnected from the lines for said bus signals by said first switch; and switch control means for controlling said first and said second switches.

6. The information processing apparatus according to claim 5, further comprising detection means for ascertaining whether or not an external device is connected to said bus connector, wherein said switch control means controls said first and said second switches responsive to the detected result.

7. The information processing apparatus according to claim 6, wherein when it is determined that an external device is connected to said bus connector, said switch control means closes said first switch and at the same time opens said second switch, and when it is determined that no external device is connected to said bus connector, said switch control means opens said first switch and at the same time closes said second switch.

8. The information processing apparatus according to claim 5, wherein at least said part of said bus signals are clock like signals, such as a clock signal, lower-bit address signals, and control signals.

9. The information processing apparatus according to claim 5, wherein said input/output bus is a Peripheral Component Interconnect (PCI) bus.

10. A method for controlling an information processing apparatus, which includes a processor, one or more input/output devices, an input/output bus for connecting said processor to said input/output devices, a bus connector for expanding said input/output bus to an external device, a first switch for electrically disconnecting at least a part of bus signal lines in said input/output bus from corresponding connector pins of said bus connector, a second switch for electrically grounding said connector pins that are disconnected from said bus signal line by said first switch, switch control means for controlling said first and said second switches, and detection means for ascertaining whether or not an external device is connected to said bus connector, said method comprising the steps of:

determining whether an external device is connected to said bus connector, and closing said first switch and opening said second switch only in response to a determination that an external device is connected to said bus connector.

11. The method for controlling an information processing apparatus according to claim 10, further including the step of opening said first switch and closing said second switch only in response to a determination that an external device is not connected to said bus connector.

12. The method for controlling an information processing apparatus according to claim 10, wherein after closing said first switch and opening said second switch said method further including the steps of:

determining whether an external device is disconnected from said bus connector, and opening said first switch and closing said second switch in response to a determination that an external device is disconnected from said bus connector.

13. The method for controlling an information processing apparatus according to claim 11, wherein after opening said first switch and closing said second switch said method further including the steps of:

determining whether an external device is connected to said bus connector, and closing said first switch and opening said second switch in response to a determination that an external device is connected from said bus connector.

14. The method for controlling an information processing apparatus according to claim 10, wherein said input/output bus is a Peripheral Component Interconnect (PCI) bus.

15. A method for controlling an information processing apparatus, which includes a processor, one or more input/output devices, an input/output bus for connecting said processor to said input/output devices, a bus connector for expanding said input/output bus to an external device, a first switch for electrically disconnecting at least a part of bus signal lines in said input/output bus from corresponding connector pins of said bus connector, a second switch for electrically grounding said connector pins that are disconnected from said bus signal line by said first switch, switch control means for controlling said first and said second switches, and detection means for ascertaining whether or not an external device is connected to said bus connector, said method comprising the steps of:

determining whether an external device is connected to said bus connector, and closing said first switch and opening said second switch only in response to a determination that an external device is connected to said bus connector.

16. The method for controlling an information processing apparatus according to claim 15, further including the step of opening said first switch and closing said second switch only in response to a determination that an external device is not connected to said bus connector.

17. The method for controlling an information processing apparatus according to claim 15, wherein after closing said first switch and opening said second switch said method further including the steps of:

determining whether an external device is disconnected from said bus connector, and opening said first switch and closing said second switch in response to a determination that an external device is disconnected from said bus connector.

18. The method for controlling an information processing apparatus according to claim 16, wherein after opening said first switch and closing said second switch said method further including the steps of:

determining whether an external device is connected to said bus connector, and closing said first switch and opening said second switch in response to a determination that an external device is connected from said bus connector.

19. The method for controlling an information processing apparatus according to claim 15, wherein at least said part of said bus signals are clock system signals, such as clock signals, lower-bit address signals, and control signals.

20. The method for controlling an information processing apparatus according to claim 15, wherein said input/output bus is a Peripheral Component Interconnect (PCI) bus.

* * * * *